(No Model.)

E. THOMSON.
REGULATOR FOR DYNAMO ELECTRIC MACHINES.

No. 265,937. Patented Oct. 10, 1882.

Witnesses.
W. B. Thomson.
Thos. Toomey.

Inventor.
E. Thomson
by H. C. Townsend,
Atty.

N. PETERS. Photo-Lithographer. Washington, D. C.

UNITED STATES PATENT OFFICE.

ELIHU THOMSON, OF NEW BRITAIN, CONNECTICUT.

REGULATOR FOR DYNAMO-ELECTRIC MACHINES.

SPECIFICATION forming part of Letters Patent No. 265,937, dated October 10, 1882.

Application filed June 26, 1882. (No model.)

*To all whom it may concern:*

Be it known that I, ELIHU THOMSON, a citizen of the United States, and a resident of New Britain, in the county of Hartford and State of Connecticut, have invented certain new and useful Improvements in Regulation of Electric Currents, of which the following is a specification.

The object of my invention is to construct a dynamo-electric machine that will automatically adapt itself to changes in the resistance of the circuit over which it operates.

It is a well-known procedure in the art to wind two wires upon the field-magnets of a dynamo-electric machine of different lengths and resistances, and one of which is fed by the direct generated current, while the other is a derived circuit around the working-resistance in the circuit.

My invention consists in making said circuits of the field bear a distinct and determinate relation to one another, thereby giving the generator novel properties. The property thus secured is an automatic adaptation to variations of circuit-resistance, in the first place to maintain a constant electro-motive force, or to automatically diminish said electro-motive force, so as to preserve a constant current in the circuit. Thus a number of incandescent lights may be run in multiple arc from the generator and one or more of them extinguished by open-circuiting without affecting the others, or a number of such lights or arc lights may be run in series and one or more removed by shunting them without affecting the remainder. Other applications of such a generator will suggest themselves.

In illustration of my invention I refer to the figures.

Figure 1:
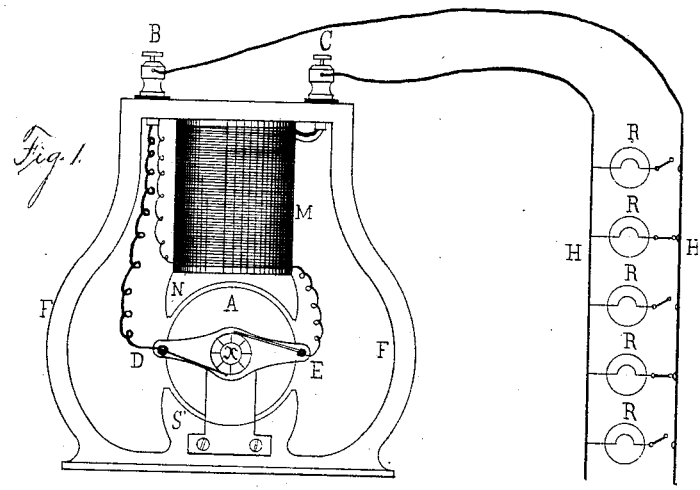
Figure 2:
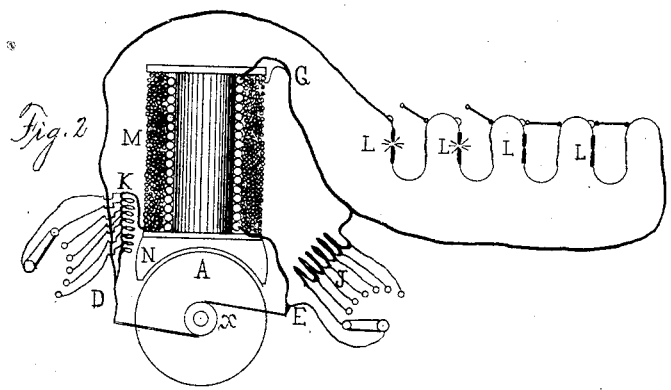
Figure 3:
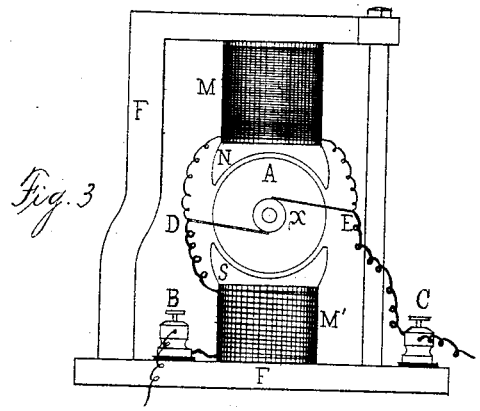

Figure 1 shows an electric generator embodying one phase of my invention; Fig. 2, a symbolic figure embodying another phase of my invention. Fig. 3 shows a generator peculiarly built for convenience in carrying my invention into practice.

The dynamo-electric generator Fig. 1 is shown as having a revolving armature, A, of any well-known construction, shaft and commutator X, and field-magnet poles N S contiguous to the armature A. Only one field-coil, M, is shown on the field-magnet frame F F, for simplicity. Any well-known form of field-magnet system may be employed. The coils upon the field are doubly wound or constitute two separate circuits—one of low resistance and the other high, the former traversed by the direct current supplying the working-circuit, and the other constituting a derived circuit around the working-resistances R R R R R, (supposed in this instance to be incandescent lamps,) supplied by the conducting-mains H H in multiple arc from the machine-terminals B C. The connections from the commutator-brushes are shown at D E. My invention does not consist in this assemblage of parts, as it is well known, but in establishing a definite relation between the magnetic force of the two windings upon the field-magnets.

Suppose that it is necessary to maintain a difference of electro-motive force of fifty volts between the two main conductors H H, whether the resistances R R R, &c., are all used or not. Having constructed an armature, A, that shall be amply sufficient to give said fifty volts when revolved at its proper velocity in a fully-magnetized field, I wind upon the field-magnets a fine wire of size and length sufficient to develop the said electro-motive force when the conductors H H are unconnected by the resistances R R, &c. This fine wire constitutes a shunt or derived circuit around the conductors H H, and the current which circulates in it is all that is developed in the armature under the conditions mentioned. In the practical construction of the machine the fine wire may of course be wound over the coarse wire, as shown in the drawings. This is not, however, a matter of importance, and although I have in setting forth the principle of the invention spoken of the fine wire as being first wound upon the core, it is to be understood that it may in practice be wound either over or under or beside the coarse wire, or that the fine and coarse wire may form separate bobbins, occupying different positions upon the core. I sometimes make the derived-circuit wire upon the field-magnet a part only of the whole derived circuit, the remainder being simply a resistance-coil outside, which may be an adjustable resistance or not, at pleasure, applied in the same manner as the resistance K, Fig. 2, to be presently described. In this case the field-magnet is wound with fine wire in the derived circuit, so that the armature, when there is an open circuit between H H, will develop an electro-motive force of, say, seventy volts. Resistance is then added to the derived circuit until the electro-motive force is reduced to fifty volts, as before. Having obtained the desired electro-motive force from the machine through the influence of the derived circuit on the field-magnet when there is an open circuit between H H, I now proceed to wind the direct-circuit wire upon the magnet, (retaining, however, the fine-wire coil as a derived-circuit coil to the direct circuit,) first connecting H to H through all the resistances R R that the machine is to carry. Enough coarse field-wire is now wound on and in the main circuit to bring the electro-motive force between H H up to fifty volts. The direct wire may be wound on as in the case of the derived circuit, so that the electro-motive force would be raised above the desired point and a portion thereafter cut out; or, more conveniently, the field-wire so wound is shunted around until the desired electro-motive force is obtained. The proportions so obtained may be afterward employed without following the steps above laid down, and applies to the case of maintaining a constant electro-motive force. The relation between the magnetizing forces of the two helices varies considerably with the construction of the machine; but in general it may be stated that with ordinary proportions and arrangements, and with all the lights in circuit, the magnetizing effect of the two windings should be not quite equal, but that the fine-wire winding should have a slightly-preponderating magnetizing effect.

In the case of operating lights L L, Fig. 2, in series, the current is required to be maintained constant, while the electro-motive force varies widely, according to the number of resistances L L put in circuit. We in this case close the circuit from the armature-terminals D E through a galvanometer of no resistance and pass the current through. Let the standard current desired be ten webers. We revolve the armature at its normal speed and wind enough wire upon the field-magnet M, through which a ten-weber current supplied from another source is sent, to give a galvanometer indication of a trifle over ten webers from the armature. Now, connect the wire into the direct circuit through the armature and lights L L, &c., in the ordinary way. We put all the lights into circuit that the machine is calculated to maintain, and, revolving the armature A at its normal speed, wind enough fine wire in a derived circuit around the lights or resistance L L to bring the current in them to the standard ten webers. Any change to a lower resistance of the circuit will not now practically affect this current. Hence the machine is self-adjusting.

Instead of proceeding as above, we may obtain an equivalent result as follows: Wind upon M fine and coarse wire, each of which is stronger in its magnetizing influence than required. Then, leaving out all the resistances L L, or, in other words, putting the machine on short circuit, at the same time disconnecting the derived-circuit coil, we introduce a shunt around the coarse field-wire, consisting of an adjustable resistance, J, of any desired kind that is capable of fine and gradual adjustment, to weaken its effects and reduce the current to the normal ten webers. Now, putting all the resistances or lights into circuit and connecting the fine-wire derived-circuit coil to the main circuit, add to the fine-wire derived circuit by adjustable resistance K a resistance sufficient to bring the current down to the normal ten webers. At this moment the magnetizing effects of the two windings will be sufficiently well balanced for practical self-regulation to varying resistance in series. In practice the magnetizing effects of the fine wire is to that of the coarse wire as the resistance of the circuit when the lights are all in circuit is to that when the lights are cut out. It is important that the iron field-cores of the machine be not so affected as to be fully saturated, even under the combined effect of the two windings. This is governed of course by principles well understood in the art, which need not here be enumerated.

Fig. 3 shows a disposition of the two magnetizing helices that is of more ready construction and more easily insulated than those described. One of the poles, N, is magnetized by the derived circuit-coil M, and the opposed pole, S, on the opposite side of the armature A, is magnetized by the smaller coarse magnet-coil, M', through which the direct or main current passes. The proportions and action are the same as in the cases where the coils overlie one another or are wound adjacent upon the same core.

The application of my invention to a system in which the lights or other working-resistances are connected in multiple arc to the main conductors I reserve for the subject of another patent, which shall cover the same specifically, my claims in the present case being made to the broad or generic invention, and to the particular application thereof to a system in which the lights or working-resistances are connected in series.

What I claim as my invention is—

1. The combination, with the field-of-force magnet in a dynamo-electric machine, of a direct-circuit and a derived-circuit magnetizing coil or helix, bearing to one another the definite magnetizing relation described, such that the magnetizing influence of one shall develop in a closed circuit connected to the armature an electro-motive force or current strength, as the case may be, the same as that produced in the main or working circuit when the field-magnet is under the influence of both coils.

2. The combination, with a dynamo-electric machine operating a series of lights or working-resistances, of two field-magnet coils, one in a direct and the other in a derived circuit to the working-resistances, the magnetizing influence of the former being related to that of the latter when all the lights are in circuit as the resistance of the circuit when the lamps or resistances are all shunted out is to the resistance of the circuit when all the lamps or working-resistances are in circuit.

3. The combination, with a dynamo-electric machine, supplying current to a number of lights or working-resistances in series, of two field magnetizing coils or helices bearing to one another the definite magnetizing relation specified, such that under the magnetizing influence of the direct-circuit helix only carrying the standard current the current flowing in a short circuit connected to the armature shall be the same as that flowing in the main circuit containing all the working-resistances when the armature is under the influence of both coils or helices and the main-circuit helix is in circuit with said armature.

4. The combination, with the field-magnet in a dynamo-electric machine, of a main and a derived circuit helix separate from one another and applied one to magnetize one pole and the other the other pole of the field-magnet.

5. The combination, in a dynamo-electric machine, of two magnetizing-helices, one in the direct and the other in a derived circuit around the work, each provided with an adjustable resistance connected thereto for the purpose of modifying and adjusting their relative magnetizing effects.

Signed at New Britain, in the county of Hartford and State of Connecticut, this 22d day of June, A. D. 1882.

ELIHU THOMSON.

Witnesses:
E. WILBUR RICE,
CHAS. M. MOREY.